US007791327B2

(12) United States Patent
Liu

(10) Patent No.: US 7,791,327 B2
(45) Date of Patent: *Sep. 7, 2010

(54) VOLTAGE CONVERTER

(75) Inventor: Yi-Sheng Liu, Hsinchu (TW)

(73) Assignee: Fitipower Integrated Technology, Inc., Miaoli County (TW)

( * ) Notice: Subject to any disclaimer, the term of this patent is extended or adjusted under 35 U.S.C. 154(b) by 175 days.

This patent is subject to a terminal disclaimer.

(21) Appl. No.: 12/147,504

(22) Filed: Jun. 27, 2008

(65) Prior Publication Data

US 2009/0167273 A1 Jul. 2, 2009

(30) Foreign Application Priority Data

Dec. 31, 2007 (CN) ................................. 96 1 51103

(51) Int. Cl.
G05F 1/575 (2006.01)
G05F 1/618 (2006.01)
(52) U.S. Cl. ........................................ 323/285; 323/284
(58) Field of Classification Search ................. 323/222, 323/224, 282, 283, 284, 285, 286, 351
See application file for complete search history.

(56) References Cited

U.S. PATENT DOCUMENTS 5,793,193 A * 8/1998 Hodgins ..................... 323/284
5,943,227 A * 8/1999 Bryson et al. ................ 363/95
7,098,632 B2 * 8/2006 Chen et al. .................. 323/222
7,629,778 B2 * 12/2009 Liu ............................ 323/222

OTHER PUBLICATIONS

Kursun et al, High Input Voltage Step-down DC-DC Converters for Integration in A Low Voltage CMOS Process, Proceedings of 2004 International Symposium on Quality of Electronic Design, Mar. 2004, p. 517-521, IEEE, San Jose, CA, USA.

* cited by examiner

Primary Examiner—Gary L Laxton
(74) Attorney, Agent, or Firm—Frank R. Niranjan

(57) ABSTRACT

A voltage converter includes a pulse width modulation controller chip, an enabling transistor, a first resistor, a pull-up transistor, a pull-down transistor, and a low pass filter. The pulse width modulation controller chip includes a plurality of pins, a gate control logic circuit, an enabling comparator, a first gate driver, a second gate driver, a current source, a first comparator, a power-on reset circuit, an inductor current sensor, a counter and current step generator, and an oscillator. The plurality of pins include a Vcc pin, a BOOT pin, a PHASE pin, a UGATE pin, a LGATE pin, and a pin OCSET. The current source, the first resistor, the inductor current sensor, the counter and current step generator, the oscillator, and the pull-down transistor constitute a light-load circuit.

11 Claims, 2 Drawing Sheets

VOLTAGE CONVERTER

BACKGROUND

1. Technical Field

The present invention relates to switching power supplies, and particularly to a DC-DC voltage converter with low power loss.

2. Description of Related Art

Direct current to direct current (DC-DC) voltage converters (voltage converter for short) based on a bridge switching circuit are widely used in various electronic devices, such as computers, mobile phones, etc. A traditional voltage converter utilizes one or more pull-up and pull-down transistors composing a bridge switching circuit to produce an alternating current (AC) signal. The AC signal is then applied to a low pass filter including an inductor and a capacitor. The low pass filter passes the DC component of the AC signal to the output of the voltage converter to power on subsequent functional modules of an electronic device. Detailed structures and characteristics of the traditional voltage converter are introduced by Volkan Kursun et al., "High Input Voltage Step-down DC-DC Converters for Integration in A Low Voltage CMOS Process", IEEE Proceedings of 2004 International Symposium on Quality of Electronic Design, pp. 517-521, San Jose, Calif., USA, 22-24 Mar. 2004.

For electronic devices, to minimize energy consumption is very important, especially for portable electronic devices. An energy consumption efficiency of the voltage converter of the electronic device in a light load mode decides the standby time of the electronic device. However, the energy consumption efficiency of the voltage converter in the light load mode is high, and the standby time of the electronic device is limited.

Therefore, an improved voltage converter is needed to address the aforementioned deficiency and inadequacies.

SUMMARY

A voltage converter includes a pulse width modulation controller chip, an enabling transistor, a first resistor, a pull-up transistor, a pull-down transistor, and a low pass filter. The pulse width modulation controller chip includes a plurality of pins, a gate control logic circuit, an enabling comparator, a first gate driver, a second gate driver, a current source, a first comparator, a power-on reset circuit, an inductor current sensor, a counter and current step generator, and an oscillator. The plurality of pins include a Vcc pin, a BOOT pin, a PHASE pin, a UGATE pin, a LGATE pin, and a pin OCSET. The current source, the first resistor, the inductor current sensor, the counter and current step generator, the oscillator, and the pull-down transistor constitute a light-load efficiency improvement circuit.

Other advantages and novel features of the present invention will become more apparent from the following detailed description of preferred embodiment when taken in conjunction with the accompanying drawings.

DETAILED DESCRIPTION OF THE EXEMPLARY EMBODIMENTS

References will now be made to the drawings to describe exemplary embodiments of the present voltage converter.

Figure 1:
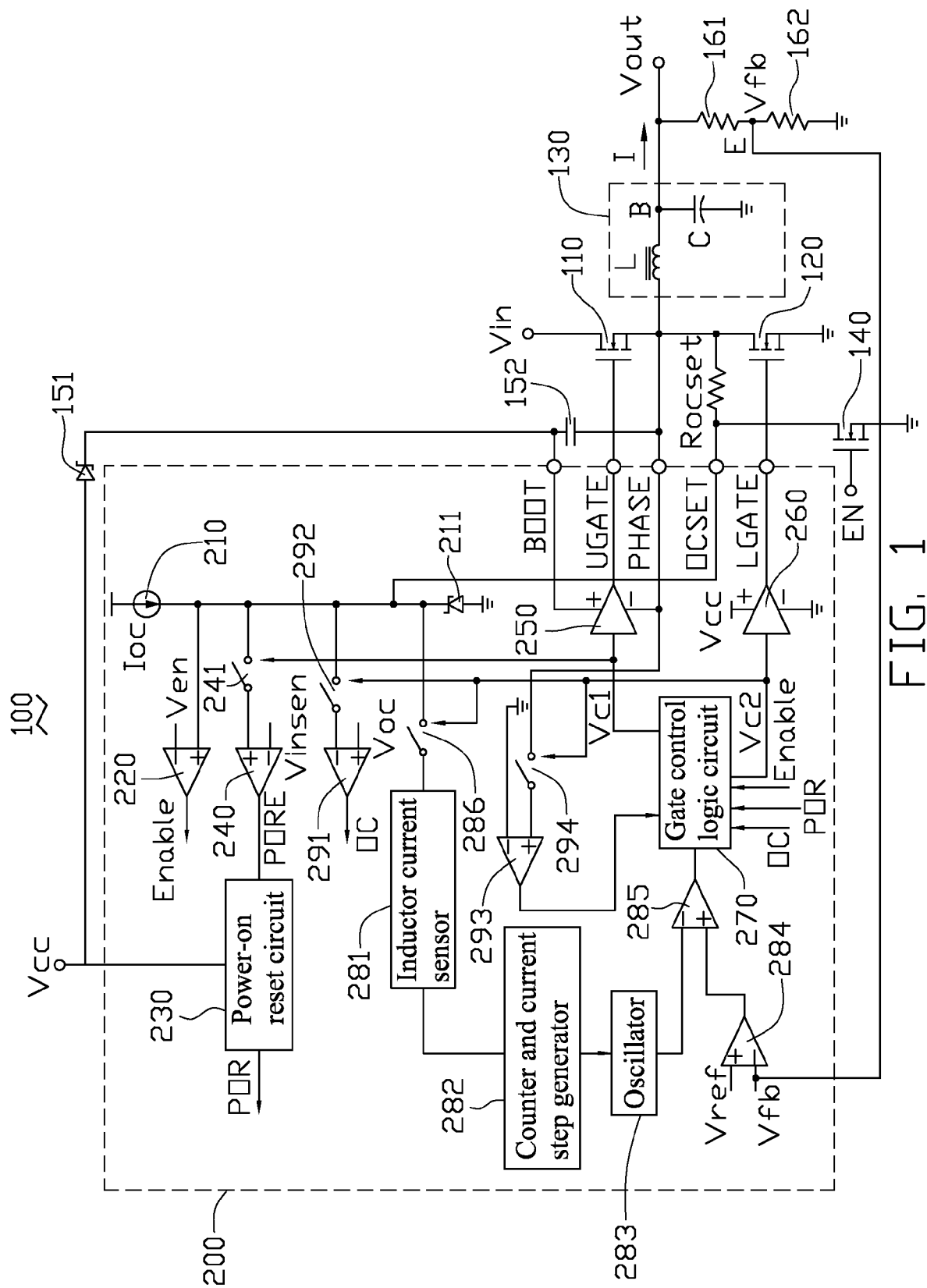
FIG. 1 is a circuit diagram of a voltage converter in accordance with a first exemplary embodiment.

Referring to FIG. 1, a voltage converter 100 includes a pulse width modulation (PWM) controller chip 200, a bridge switching circuit composed of a pull-up transistor 110 and a pull-down transistor 120, a low pass filter 130, and an enabling transistor 140. The voltage converter 100 is a bootstrap voltage converter.

The PWM controller chip 200 includes a plurality of pins, such as a Vcc pin, a BOOT pin, a UGATE pin, a PHASE pin, a OCSET pin, and a LGATE pin. The PHASE pin and the OCSET pin are configured to act as multi-function pins. The Vcc pin is connected to a first power supply (not shown) for receiving a voltage (also labeled as Vcc). The BOOT pin is connected to the first power supply via a diode 151 for receiving power from the first power supply. In the exemplary embodiment, the diode 151 is a schottky barrier diode. A capacitor 152 is connected between the BOOT pin and PHASE pin. A resistor Rocset is connected between the OCSET pin and the PHASE pin. The OCSET pin is also connected to the source of the enabling transistor 140. The drain of the enabling transistor 140 is grounded. The gate of the enabling transistor 140 is configured to act as an enabling pin EN of the voltage converter 100.

The pull-up transistor 110 and the pull-down transistor 120 are connected in series between a second power supply Vin and ground. The second power supply Vin is the main power supply of the voltage converter 100, and is configured for supplying a voltage (also labeled as Vin). The pull-up transistor 110 is a common-drain transistor. The pull-down transistor 120 is a common-source transistor. The source of the pull-up transistor 110 is connected to the second power supply Vin for receiving the voltage Vin. The drain of the pull-up transistor 110 is connected to the drain of the pull-down transistor 120 and the PHASE pin of the PWM controller chip 200. The gate of the pull-up transistor 110 is connected to the UGATE pin. The source of the pull-down transistor 120 is grounded, and the gate of the pull-down transistor 120 is connected to the LGATE pin of the PWM controller chip 200.

In the exemplary embodiment, the low pass filter 130 includes an inductor L and a capacitor C. A terminal of the inductor L is connected to the PHASE pin, and another terminal of the inductor L is connected to the anode of the capacitor C. The connection node between the inductor L and the capacitor C is referred to as node B, and performs as an output terminal of the voltage converter 100 to output a stable output voltage Vout. The cathode of the capacitor C is grounded. Two resistors 161, 162 are connected in series between the node B and ground. The node between the resistors 161, 162 is referred to as node E for generating a feedback voltage Vfb supplied to a feedback pin (not shown) of the PWM controller chip 200. The feedback voltage Vfb is directly proportional to the output voltage Vout of the voltage converter 100.

The PWM controller chip 200 includes a current source 210, an enabling comparator 220, a power-on reset circuit 230, a first comparator 240, a first gate driver 250, a second gate driver 260, a gate control logic circuit 270, a second comparator 291, a third comparator 293, an inductor current sensor 281, a counter and current step generator (generator for short) 282, an oscillator 283, a fourth comparator 284, and a fifth comparator 285.

The current source 210 is connected to the OCSET pin that is connected to the cathode of a zener diode 211. The anode of the zener diode 211 is grounded.

The non-inverting input terminal of the enabling comparator 220 is connected to the OCSET pin. A reference voltage Ven is applied to the inverting input terminal of the enabling comparator 220.

In operation, when the enabling pin EN of the voltage converter 100 is powered, in other words, when the gate of the enabling transistor 140 is powered, the enabling transistor 140 is turned on and the OCSET pin is pulled to ground. Therefore, the voltage at the OCSET pin is lower than the reference voltage Ven, the enabling comparator 220 does not operate, and the PWM controller chip 200 is disabled. When the enabling transistor 140 is disabled and the voltage at the OCSET pin is higher than the reference voltage Ven, an enabling signal is outputted to enable the gate control logic circuit 270.

A first output terminal of the gate control logic circuit 270 is configured for outputting a first drive signal Vc1 to the input terminal of the first gat driver 250. A second output terminal of the gate control logic circuit 270 is configured for outputting a second drive signal Vc2 to the input terminal of the second gate driver 260. The first and second drive signals Vc1, Vc2 are the inverse of each other. That is, at any time, only one of the first and second drive signals Vc1, Vc2 is high/low.

The positive power supply terminal of the first gate driver 250 is connected to the BOOT pin for receiving power from the first power supply through the diode 151. The negative power supply terminal of the first gate driver 250 is connected to the PHASE pin. The output terminal of the first gate driver 250 is connected to the UGATE pin for outputting a third drive signal to the pull-up transistor 110. The positive power supply terminal of the second gate driver 260 is connected to the Vcc pin. The negative power supply terminal of the second gate driver 260 is connected to the GND pin. The output terminal of the second gate driver 260 is connected to the LGATE pin for outputting a fourth drive signal to the pull-down transistor 120. In the exemplary embodiment, the first and second gate drivers 250, 260 are unity gain buffer amplifiers. Thus, the voltages and waveforms of the third and fourth drive signals are the same as the voltages and waveforms of the first and second drive signals Vc1, Vc2, respectively.

In the exemplary embodiment, the power-on reset circuit 230, the first comparator 240, and the pull-up transistor 110 cooperatively constitute a power supply detecting circuit to detect an on-off state of the voltage converter 100.

The non-inverting input terminal of the first comparator 240 is connected to the OCSET pin via a switch 241. A reference voltage Vinsen is applied to the inverting input terminal of the first comparator 240. The output terminal of the first comparator 240 is connected to a first input terminal of the power-on reset circuit 230. A second input terminal of the power-on reset circuit 230 is connected to the Vcc pin. The output terminal of the power-on reset circuit 230 is configured for generating and transmitting a power-on reset signal POR to the gate control logic circuit 270.

The control terminal of the switch 241 is connected to the first output terminal of the gate control logic circuit 270. The switch 241 is controlled by the first drive signal Vc1, so is the transistor 110. When the pull-up transistor 110 is turned on, the switch 241 is closed, and the first comparator 240 compares the voltage at the OCSET pin with the reference voltage Vinsen. That is, the first comparator 240 and the pull-up transistor 110 operate synchronously.

The power supply detecting circuit behaves in the following manner. When the gate control logic circuit 270 is enabled, the gate control logic circuit 270 outputs a predetermined high voltage to the first gate driver 250 to turn on the pull-up transistor 110 for a predetermined time period. In response to the predetermined high voltage, the first gate driver 250 turns on the pull-up transistor 110 and the switch 241 is opened as well. A voltage applied at the PHASE pin becomes equal to the voltage Vin of the second power supply Vin. Because the OCSET pin is connected to the PHASE pin via the resistor Rocset, a voltage at the OCSET pin changes in response to a change of the voltage of the PHASE pin. As a result, the voltage at the OCSET pin is higher than the reference voltage Vinsen. During the predetermined time period, if the voltage at the OCSET pin is higher than the reference voltage Vinsen, this would mean that the voltage converter 100 is powered on and ready, and the first comparator 240 outputs a PORE signal to the power-on reset circuit 230. In response to the PORE signal, the power-on reset circuit 230 outputs the power-on reset signal POR to the gate control logic circuit 270 that then outputs the first and second drive signals Vc1, Vc2 to switch on and off the transistors 110, 120 respectively. To sum up, the power supply detecting circuit detects the on-off state of the voltage converter 100 by detecting the voltage of the OCSET pin.

In response to the power-on reset signal POR, the gate control logic circuit 270 outputs the first and second drive signals Vc1, Vc2 to the first and second gate drivers 250, 260, respectively. Because the first and second drive signals Vc1, Vc2 are the inverse of each other, at any time, when one of the transistors 110, 120 is turned on, the other is turned off. Therefore, voltage pulses swinging between ground potential and Vin are generated at PHASE pin to charge and discharge the capacitor C through the inductor L. Accordingly, the output voltage Vout and a DC output current I are generated.

In the exemplary embodiment, the second comparator 291, the current source 210, the resistor Rocset, and the pull-down transistor 120 cooperatively constitute an over-current protection circuit.

The inverting terminal of the second comparator 291 is connected to the OCSET pin via a switch 292, and a reference voltage Voc is applied to the non-inverting terminal of the second comparator 291. The output terminal of the second comparator 291 is connected to the gate control logic circuit 270 for outputting an over-current signal OC when the voltage at the OCSET pin is lower than the reference voltage Voc. The control terminal of the switch 292 is connected to the second output terminal of the gate control logic circuit 270. The switch 292 is controlled by the second drive signal Vc2, so is the pull-down transistor 120. When the pull-down transistor 120 is turned on, the switch 292 is closed and the second comparator 291 compares the voltage at the OCSET pin with the reference voltage Voc. That is, the second comparator 291 and the pull-down transistor 120 operate synchronously.

The over-current protection circuit behaves in the following manner. As described above, the voltage at the OCSET pin changes in response to the change of the voltage at the PHASE pin. It is considered that the output current of the voltage converter 100 is an over-current when the voltage at the OCSET pin is lower than the reference voltage Voc. When the output current of the voltage converter 100 is an over-current, the second comparator 291 outputs the over-current signal OC to the gate control logic circuit 270. In response, the gate control logic circuit 270 turns off the transistors 110, 120 to reduce the output current I of the voltage converter 100.

To sum up, the over-current protection circuit detects an over-current condition function by detecting the voltage of the OCSET pin. That is, the OCSET pin can be employed as a multi-function pin that can facilitate (provide) the over-current protection function.

In the exemplary embodiment, the third comparator 293 and the pull-down transistor 120 cooperatively constitute an inverse current protection circuit.

The inverting terminal of the third comparator 293 is grounded, the non-inverting terminal of the third comparator 293 is connected to the PHASE pin via a switch 294, and the output terminal of the third comparator 293 is connected to the gate control logic circuit 270. The control terminal of the switch 294 is connected to the second output terminal of the gate control logic circuit 270. Thus, the switch 294 is controlled by the second drive signal Vc2, so is the pull-down transistor 120. When the pull-down transistor 120 is turned on, the switch 294 is closed and the third comparator 293 compares the voltage at the OCSET pin with the reference voltage Voc. That is, the third comparator 293 and the pull-down transistor 120 operate synchronously.

The inverse current protection circuit behaves in the following manner. When the voltage at the PHASE pin is lower than ground potential, it is considered that the voltage converter 100 is in a discontinuous current mode (DCM), and a current referred to as an inverse current may flow from the drain of the pull-down transistor 120 to the source of the pull-down transistor 120. When the voltage at the PHASE pin is lower than ground potential, the third comparator 293 outputs an inverse current protection signal to the gate control logic circuit 270. In response, the gate control logic circuit 270 turns off the pull-down transistor 120 to prevent an inverse current from flowing through the pull-down transistor 120. Therefore, power consumption due to the inverse current can be reduced/prevented. To sum up, the inverse current protection circuit detects the DCM mode by detecting the voltage of the PHASE pin. That is, the PHASE pin can be employed as a multi-function pin that can facilitate (provide) the inverse current protection function.

In the exemplary embodiment, the inductor current sensor 281, the counter and current step generator 282, the oscillator 283, the fourth and fifth comparators 284, 285, the resistor Rocset, the pull-down transistor 120, and the current source 210 cooperatively constitute a light-load efficiency improvement circuit for improving the efficiency of the voltage converter 100 in the DCM mode.

The input terminal of the inductor current sensor 281 is connected to the OC SET pin via a switch 286 to indirectly detect the voltage at the OCSET pin. The output terminal of the inductor current sensor 281 is connected to the input terminal of the counter and current step generator 282. The output terminal of the counter and current step generator 282 is connected to the input terminal of the oscillator 283 whose output terminal is connected to the inverting input terminal of the fifth comparator 285. The non-inverting input terminal of the fifth comparator 285 is connected to the output terminal of the fourth comparator 284. The output terminal of the fifth comparator 285 is connected to the gate control logic circuit 270.

The control terminal of the switch 286 is connected to the second output terminal of the gate control logic circuit 270. Thus, the switch 286 is controlled by the second drive signal Vc2, so is the pull-down transistor 120. When the pull-down transistor 120 is turned on, the switch 286 is closed to connect the input terminal of the inductor current sensor 281 to the OCSET pin. Therefore, the inductor current sensor 281 and the pull-down transistor 120 operate synchronously.

The light-load efficiency improvement circuit behaves in the following manner. When the pull-down transistor 120 turns on, the pull-down transistor 120, the current source 210, and the resistor Rocset form a loop. The inductor current sensor 281 detects the current flowing through the OCSET pin, and correspondingly outputs a control signal to indicate the amount of the current. The counter and current step generator 282 determines whether the voltage converter 100 is in a DCM mode in response to the control signal. When the counter and current step generator 282 determines that the current flowing through the OCSET pin is continuously to be a light-load current, it is considered that the voltage converter 100 is in the DCM mode. The counter and current step generator 282 outputs a current to the oscillator 292 to reduce a frequency generated by the oscillator 292. In response to the reduced frequency, the gate control logic circuit 270 reduces the frequencies of the first and second drive signals Vc1, Vc2. Therefore, the switching frequencies of the transistors 110, 120 are correspondingly reduced. As a result, energy loss due to the switching of the transistors 110 and 120 is reduced in the DCM mode, a standby time of an electronic device using the voltage converter 100 is prolonged, and energy consumption efficiency of the voltage converter 100 is also decreased. To sum up, when performing a light-load efficiency improvement function, the light-load efficiency improvement circuit determines whether the voltage converter 100 is in the DCM mode by detecting the current flowing through the OCSET pin. That is, the OCSET pin can be employed as a multi-function pin that can facilitate (provide) the light-load efficiency improvement function.

To sum up, in the exemplary embodiment, the OCSET pin and PHASE pin server as the multi-function pins for performing multi-functions, such as over-current protection, inverse current protection, light-load efficiency improvement, etc. Therefore, no other pin is needed in the PWM controller chip 200, and a size of the voltage converter 100 can be minimized. The cost for packaging of the PWM controller chip 200 is reduced.

Figure 2:
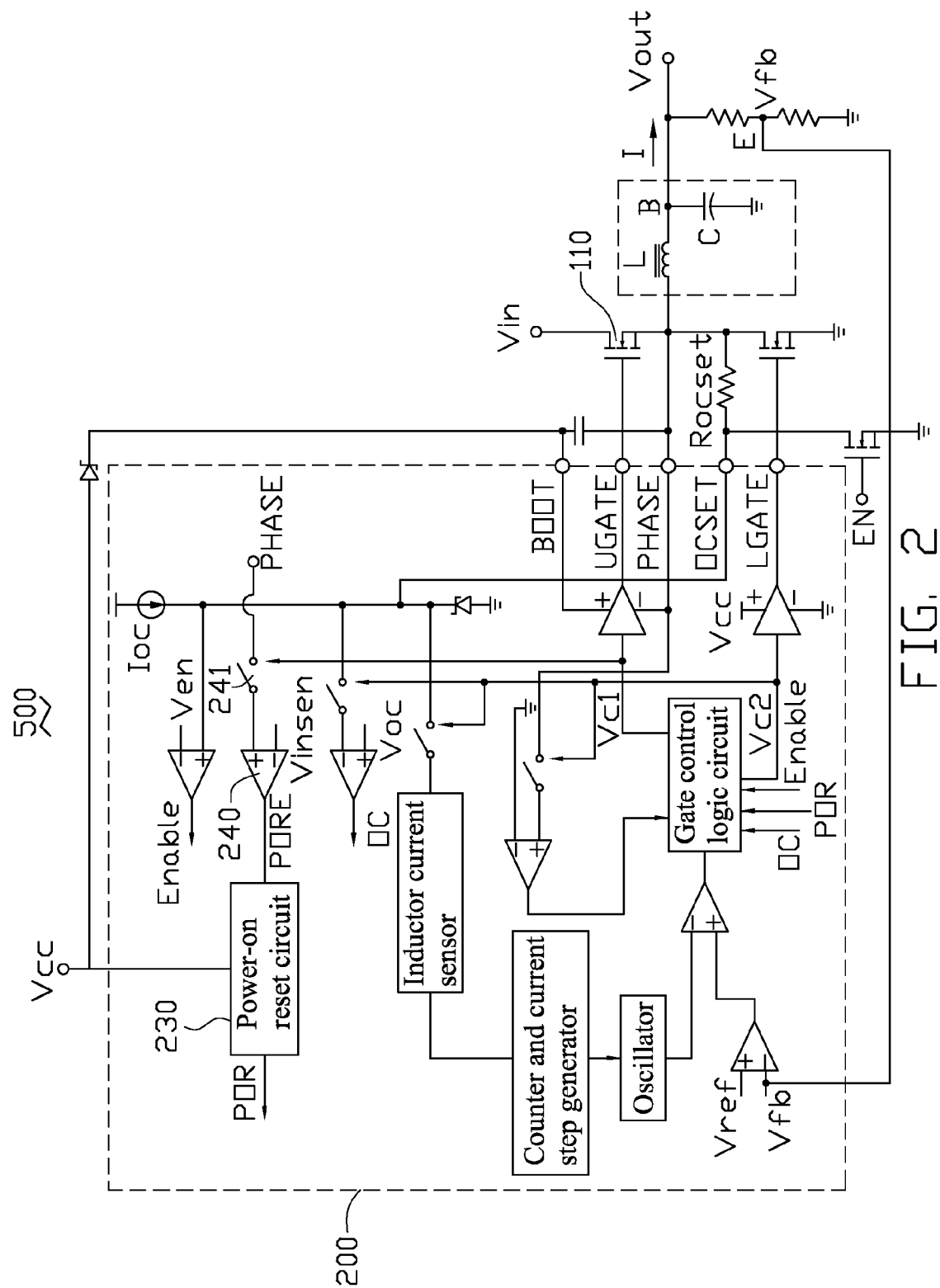
FIG. 2 is a circuit diagram of a voltage converter in accordance with a second exemplary embodiment.

Referring to FIG. 2, a voltage converter 500 is similar to the voltage converter 100. Comparing to the voltage converter 100, the non-inverting input terminal of the first comparator 240 in the voltage converter 500 is connected to the PHASE pin. That is, the power supply detecting circuit detects the on-off state of the voltage converter 500 by detecting the voltage of the PHASE pin directly. Thus, the PHASE pin can be employed as a multi-function pin that can facilitate (provide) the on-off state detection function.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A voltage converter, comprising:
   a pulse width modulation controller chip comprising:
   a plurality of pins, the plurality of pins comprise a Vcc pin connected to a first power supply, a BOOT pin connected to the Vcc pin via a diode for receiving power from the first power supply, a PHASE pin connected to the BOOT pin via a capacitor, a OCSET pin connected to the PHASE pin via a first resistor, a UGATE pin, and a LGATE pin;

a gate control logic circuit for outputting a first drive signal and a second drive signal that is the inverse of the first drive signal;

an enabling comparator for generating an enable signal when a voltage at the OCSET pin is higher than a first reference voltage;

a first gate driver comprising an input terminal for receiving the first drive signal, a positive power supply terminal connected to the BOOT pin, a negative power supply terminal connected to the PHASE pin, and an output terminal for outputting a third drive signal;

a second gate driver comprising an input terminal for receiving the second drive signal, a positive power supply terminal connected to the Vcc pin, a negative power supply terminal electrically grounded, and an output terminal for outputting a fourth drive signal that is the inverse of the third drive signal;

a current source connected to the OCSET pin which is also connected to the cathode of a zener diode, and the anode of the zener diode is grounded;

a first comparator for generating a control signal when a voltage at the OCSET pin is higher than a second reference voltage;

a power-on reset circuit for generating a power-on reset signal in response to the control signal;

an inductor current sensor for detecting a first current flowing through the OCSET pin;

a counter and current step generator for generating a control signal when the voltage converter is in a discontinuous current mode according to the first current; and an oscillator for reducing a frequency outputted to signal the gate control logic circuit to reduce frequencies of the first and second drive signal;

an enabling transistor comprising a source connected to the OCSET pin, a drain that is grounded, and a gate serving as an enabling pin of the voltage converter;

a pull-up transistor comprising a gate connected to the UGATE pin for receiving the third drive signal, a source connected to a second power supply, and a drain connected to the PHASE pin;

a pull-down transistor comprising a drain connected to the PHASE pin, a gate connected to the LGATE pin for receiving the fourth drive signal, and a source that is grounded; and a low pass filter comprising an input terminal connected to the PHASE pin, and an output terminal serving as an output terminal of the voltage converter;

wherein the gate control logic circuit generates the first and second drive signals for the first and second gate driver to respectively switch on and off the pull-up transistor and the pull-down transistor in response to the enabling signal and the power-on reset signal.

2. The voltage converter as described in claim 1, further comprising a first switch connected between a non-inverting terminal of the first comparator and the OCSET pin, the first switch being controlled by the first drive signal, so that the first comparator and the pull-up transistor operate synchronously.

3. The voltage converter as described in claim 1, wherein the low pass filter comprises an inductor and a capacitor, a terminal of the inductor is connected to the PHASE pin, another terminal of the inductor serves as the output terminal of the voltage converter, and is connected to the anode of the capacitor, and the cathode of the capacitor is grounded.

4. The voltage converter as described in claim 1, further comprising a second comparator for generating an over-current signal when the voltage at the OCSET pin is lower than a third reference voltage.

5. The voltage converter as described in claim 4, further comprising a second switch connected between an inverting terminal of the second comparator and the OCSET pin, the second switch is controlled by the second drive signal, so that the second comparator and the pull-down transistor operate synchronously.

6. The voltage converter as described in claim 1, further comprising a third comparator for generating an inverse current protection signal when a voltage at the PHASE pin is lower than ground potential.

7. The voltage converter as described in claim 6, further comprising a third switch connected between a non-inverting terminal of the third comparator and the PHASE pin, the third switch is controlled by the second drive signal, so that the third comparator and the pull-down transistor operate synchronously.

8. The voltage converter as described in claim 1, further comprising a fourth comparator and a fifth comparator, a feedback voltage of the voltage converter is applied to an inverting input terminal of the fourth comparator, a fourth reference voltage is applied to the non-inverting input terminal of the fourth comparator, an output terminal of the fourth comparator is connected to a non-inverting input terminal of the fifth comparator, an inverting input terminal of the fifth comparator is connected to an output terminal of the oscillator, and the output terminal of the fifth comparator is connected to the gate control logic circuit.

9. The voltage converter as claimed in claim 8, wherein the feedback voltage equals to the output voltage of the voltage converter.

10. The voltage converter as claimed in claim 8, further comprising a second resistor and a third resistor connected in series between the output terminal of the voltage converter and ground, a node between the second and third resistors provides the feedback voltage for the fourth comparator.

11. The voltage converter as described in claim 1, further comprising a fourth switch connected between the inductor current sensor and the OCSET pin, the fourth switch is controlled by the second drive signal, so that the inductor current sensor and the pull-down transistor operate synchronously.

* * * * *